(12) United States Patent
Ghanbari et al.

(10) Patent No.: US 10,789,788 B1
(45) Date of Patent: Sep. 29, 2020

(54) SYSTEMS AND METHODS FOR QUERYING FLEET INFORMATION STORED IN A DISTRIBUTED DATA CENTER

(71) Applicant: SmartDrive Systems, Inc., San Diego, CA (US)

(72) Inventors: Reza Ghanbari, San Diego, CA (US); Daniel Andrew Deninger, Carlsbad, CA (US); Mark Freitas, San Diego, CA (US); Nicholas Shayne Brookins, Encinitas, CA (US); Slaven Sljivar, San Diego, CA (US); Jason Palmer, Carlsbad, CA (US); Jeffrey Griswold, San Diego, CA (US); David Forney, La Jolla, CA (US)

(73) Assignee: SmartDrive Systems, Inc., San Diego, CA (US)

(*) Notice: Subject to any disclaimer, the term of this patent is extended or adjusted under 35 U.S.C. 154(b) by 75 days.

(21) Appl. No.: 16/058,591

(22) Filed: Aug. 8, 2018

(51) Int. Cl.
 *G07C 5/00* (2006.01)
 *H04L 29/08* (2006.01)
 *G07C 5/08* (2006.01)
 *H04L 29/06* (2006.01)

(52) U.S. Cl.
 CPC .......... *G07C 5/008* (2013.01); *G07C 5/0816* (2013.01); *H04L 67/125* (2013.01); *H04L 67/42* (2013.01)

(58) Field of Classification Search
 CPC ......... G07C 5/008; G07C 5/0841; G08G 1/20
 See application file for complete search history.

(56) References Cited

U.S. PATENT DOCUMENTS

| | | | |
|---|---|---|---|
| 6,735,630 B1 | 5/2004 | Gelvin | |
| 6,812,888 B2 | 11/2004 | Drury | |
| 6,889,831 B2 | 5/2005 | Pike | |
| 7,020,701 B1 | 3/2006 | Gelvin | |
| 7,489,993 B2 | 2/2009 | Coffee | |
| 7,715,961 B1 | 5/2010 | Kargupta | |
| 10,102,691 B1 | 10/2018 | Ghanbari | |
| 10,482,686 B2 | 11/2019 | Ghanbari | |
| 2015/0269790 A1 | 9/2015 | Batcheller | |
| 2016/0140872 A1* | 5/2016 | Palmer | G06K 9/00791 434/65 |
| 2016/0300402 A1* | 10/2016 | Nassar | G07C 5/0808 |
| 2017/0292845 A1 | 10/2017 | Yamasaki | |
| 2017/0351990 A1 | 12/2017 | Hecht | |
| 2018/0188045 A1 | 7/2018 | Wheeler | |
| 2019/0325665 A1 | 10/2019 | Ghanbari | |
| 2019/0325745 A1 | 10/2019 | Brookins | |
| 2020/0074764 A1 | 3/2020 | Ghanbari | |

OTHER PUBLICATIONS

International Search Report and Written Opinion for PCTUS1927860, dated Jul. 10, 2019; 12 pages.

\* cited by examiner

*Primary Examiner* — Kenneth J Malkowski
(74) *Attorney, Agent, or Firm* — Esplin & Associates, PC

(57) ABSTRACT

This disclosure relates to a distributed data center that includes resources carried by a fleet of vehicles. Individual vehicles carry sensors configured to generate output signals conveying information related to the vehicles and/or the surroundings of the vehicles. The system includes a remote computing server configured to obtain executable code from a user, and subsequently transmit the executable code to individual vehicles in the fleet. Individual vehicles locally execute the executable code to produce local results, and subsequently transfer the results to the remote computing server for presentation to the user.

19 Claims, 5 Drawing Sheets

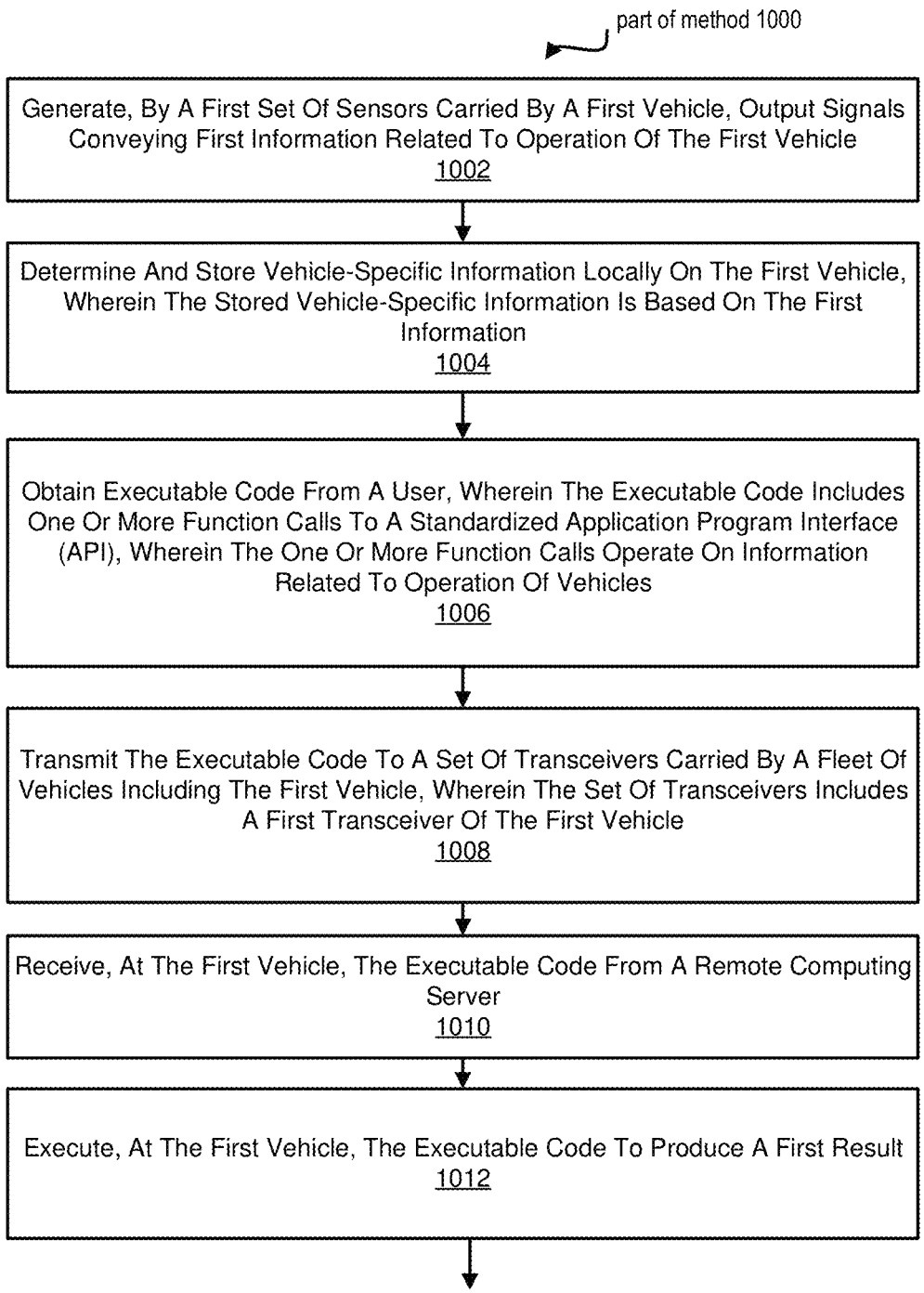
FIG. 4A
Continued on next figure, see Fig. 4B

SYSTEMS AND METHODS FOR QUERYING FLEET INFORMATION STORED IN A DISTRIBUTED DATA CENTER

FIELD

The systems and methods disclosed herein are related to using on-board resources of individual vehicles in a fleet of vehicles as a distributed data center that can be queried from a centralized server. In particular, a user can provide executable code through the centralized server for execution on individual vehicles of the fleet of vehicles.

BACKGROUND

Systems configured to record, store, and transmit video, audio, and sensor data associated with a vehicle, e.g. responsive to an accident involving the vehicle, are known. Typically, such systems detect an accident based on data from a single sensor such as an accelerometer. Some systems store information locally for subsequent analysis. Vehicle Engine Control Component (ECM) systems are known. Such systems interface/interoperate with external computers (e.g., at an automobile mechanic) where the data stored by the ECM system is analyzed.

SUMMARY

One aspect of the disclosure relates to a system configured to use a distributed data center to query a fleet of vehicles. The data-processing resources carried by the fleet of vehicles operate as the distributed data center. The fleet of vehicles may include one or more of a first vehicle, a second vehicle, a third vehicle, and/or a fourth vehicle, and so forth. Individual vehicles may include a set of resources for data processing and/or electronic storage, including but not limited to persistent storage. Individual vehicles may include a set of sensors configured to generate output signals conveying information related to one or both of the operation of the individual vehicles and the surroundings of individual vehicles. As used herein, transmission and/or distribution of information may be considered a data processing function. As used herein, the terms data and information may be used interchangeably. The system may include sets of resources, sets of sensors, a remote computing server (also referred to as centralized server), and/or other components.

One or more components of the system may include one or more processors and/or other mechanisms/components for processing information. For example, a set of resources included in and/or carried by an individual vehicle may include one or more processors. For example, the remote computing server may include one or more processors. In some implementations, other vehicle-specific components, such as, by way of non-limiting example, a vehicle event recorder, may include one or more processors. In some implementations, some or all of the processors may be configured via machine-readable instructions to perform various functions. As used herein, the term "processor" is used interchangeably with the term "physical processor."

A set of resources included in and/or carried by an individual vehicle may include one or more processors, electronic storage, a transceiver, and/or other components. The first vehicle may carry a first set of resources. The second vehicle may carry a second set of resources, and so forth. The first set of resources may include a first transceiver. The second set of resources may include a second transceiver, and so forth.

Transceivers may be configured to transfer and/or receive information to and/or from other elements of the system, including but not limited to other vehicles (or components carried by other vehicles), the remote computing server, and/or other components. In some implementations, transceivers may be configured to transfer and/or receive information wirelessly, and/or otherwise provide resources for the distribution of information. For example, a transceiver may be configured to receive executable code, queries, and/or other information. For example, a transceiver may be configured to transmit results from executable code, responses to queries, and/or other information, e.g., to a remote computing server. In some implementations, transceivers may be configured to obtain, measure, and/or otherwise determine one or more conditions related to data transmissions. For example, one or more current local data transmission conditions may include a current bandwidth (e.g., in MB/s), a current transmission protocol (e.g., LTE, 3G, 4G, 5G, Wi-Fi, etc.), a current transmission cost (e.g., in $/MB), and/or other conditions.

A set of sensors may be configured to generate output signals conveying information. In some implementations, the generated information may be related to one or both of the operation of one or more vehicles and the surroundings of one or more vehicles. An individual set of sensors may be carried by an individual vehicle. The generated information may include timing information, location information, (vehicle) operator information, and/or other information. In some implementations, generated information may be associated with timing information (e.g., from a timer), location information, operator information, and/or other information.

In some implementations, timing information may associate and/or otherwise relate the generated output signals with one or more moments of generation by one or more particular sensors. For example, timing information may include time stamps that indicate moments of generation. For example, at a time labeled $t_1$ the speed of a vehicle may be 50 mph, at a time labeled $t_2$ the speed may be 55 mph, and so forth. A set of time stamps or moments in time may form a timeline. In some implementations, location information may associate and/or otherwise relate the generated output signals with one or more locations of generation (or, locations at the moment of generation) by one or more particular sensors. In some implementations, the operator information may associate and/or otherwise relate the generated output signals with individual vehicle operators at the moments of generation. For example, a particular sensor may generate a particular output signal conveying a particular operating parameter of an individual vehicle, such as speed and/or another operating parameter. The particular output signal may include and/or be associated with a timestamp (e.g., time=$t_x$) that indicates when the particular output signal was generated. For example, a series of output signals may be associated with a corresponding series of timestamps. In some implementations, the particular output signal may be associated with a particular vehicle operator. For example, the particular output signal may be associated with the particular vehicle operator that was operating the individual vehicle at the time the particular output signal was generated. In some implementations, a set of resources may be configured to store generated information, timing information, location information, operator information, and/or other information, e.g. in electronic storage.

In some implementations, a sensor may be configured to generate output signals conveying information related to the operation of the vehicle (which may include information related to one or more operating conditions of the vehicle).

Information related to the operation of the vehicle may include feedback information from one or more of the mechanical systems of the vehicle, and/or other information. In some implementations, at least one of the sensors may be a vehicle system sensor included in an engine control module (ECM) system or an electronic control module (ECM) system of the vehicle. In some implementations, one or more sensors may be carried by the vehicle. The sensors of a particular vehicle may be referred to as a set of sensors. An individual sensor may be vehicle-specific.

Individual sensors may be configured to generate output signals conveying information, e.g., vehicle-specific information. The information may include visual information, motion-related information, position-related information, biometric information, and/or other information. In some implementations, one or more components of the system may determine one or more parameters that are measured, derived, estimated, approximated, and/or otherwise determined based on one or more output signals generated by one or more sensors.

Sensors may include, by way of non-limiting example, one or more of an altimeter (e.g. a sonic altimeter, a radar altimeter, and/or other types of altimeters), a barometer, a magnetometer, a pressure sensor (e.g. a static pressure sensor, a dynamic pressure sensor, a pitot sensor, etc.), a thermometer, an accelerometer, a gyroscope, an inertial measurement sensor, global positioning system sensors, a tilt sensor, a motion sensor, a vibration sensor, an image sensor, a camera, a depth sensor, a distancing sensor, an ultrasonic sensor, an infrared sensor, a light sensor, a microphone, an air speed sensor, a ground speed sensor, an altitude sensor, medical sensors (including but not limited to blood pressure sensor, pulse oximeter, heart rate sensor, etc.), degree-of-freedom sensors (e.g. 6-DOF and/or 9-DOF sensors), a compass, and/or other sensors. As used herein, the term "motion sensor" may include one or more sensors configured to generate output conveying information related to position, location, distance, motion, movement, acceleration, and/or other motion-based parameters. Output signals generated by individual sensors (and/or information based thereon) may be stored and/or transferred in electronic files. In some implementations, output signals generated by individual sensors (and/or information based thereon) may be streamed to one or more other components of the system.

As mentioned, individual sensors may include image sensors, cameras, and/or other sensors. As used herein, the terms "camera" and/or "image sensor" may include any device that captures images, including but not limited to a single lens-based camera, a camera array, a solid-state camera, a mechanical camera, a digital camera, an image sensor, a depth sensor, a remote sensor, a lidar, an infrared sensor, a (monochrome) complementary metal-oxide-semiconductor (CMOS) sensor, an active pixel sensor, and/or other sensors. Individual sensors may be configured to capture information, including but not limited to visual information, video information, audio information, geolocation information, orientation and/or motion information, depth information, and/or other information. Information captured by one or more sensors may be marked, time-stamped, annotated, and/or otherwise processed such that information captured by other sensors can be synchronized, aligned, annotated, and/or otherwise associated therewith. For example, video information captured by an image sensor may be synchronized with information captured by an accelerometer, GPS unit, or other sensor. Output signals generated by individual image sensors (and/or information based thereon) may be stored and/or transferred in electronic files.

In some implementations, an image sensor may be integrated with electronic storage such that captured information may be stored, at least initially, in the integrated embedded storage of a particular vehicle. In some implementations, one or more components carried by an individual vehicle may include one or more cameras. For example, a camera may include one or more image sensors and electronic storage media. In some implementations, an image sensor may be configured to transfer captured information to one or more components of the system, including but not limited to remote electronic storage media, e.g. through "the cloud."

The system may be coupled to individual vehicles. For example, the system may be communicatively coupled to individual vehicles and/or to components carried by individual vehicles, including but not limited to transceivers. For example, components of the system may be configured to communicate through one or more networks. The one or more networks may, by way of non-limiting example, include the internet.

The remote computing server may include one or more processors. The remote computing server may be remote, separate, and/or discrete from the fleet of vehicles. The one or more processors may be configured via machine-readable instructions to perform various functions. The remote computing server may be configured to facilitate presentation of a user interface to a user of the remote computing server, including but not limited to a third party using the remote computing server to query the fleet of vehicles. As used herein, the term "third party" may refer to an entity that neither owns nor operates the fleet of vehicles and neither owns nor operates the remote computing server. The user interface may be configured to facilitate interaction between one or more users and the remote computing server. For example, the user interface may be configured to receive user input, executable code, and/or other information from a user. The remote computing server may be further configured to transmit information based on received user input, received executable code, and/or other received information to some vehicles in the fleet or to all vehicles of the fleet. Information from individual vehicles, including but not limited to responses, results and/or other information generated by individual vehicles, may be transferred to, received by, and processed, analyzed, and/or presented by the remote computing server.

In some implementations, a set of resources included in and/or carried by an individual vehicle may include an event recorder (also referred to as vehicle event recorder). An event recorder may be configured to generate, detect, identify, capture, and/or record information related to the operation of a vehicle. Information related to a vehicle may include, by way of non-limiting example, information related to and/or based on vehicle events. An event recorder may be configured to off-load and/or otherwise transmit information. In some implementations, an event recorder may include one or more physical processors, electronic storage, and/or other components.

In some implementations, an event recorder may detect vehicle events based on a comparison of the information conveyed by the output signals from one or more sensors to predetermined (variable and/or fixed) values, threshold, functions, and/or other information. An event recorder may identify vehicle events and/or other information related to the operation of a vehicle in real-time or near real-time during operation of a vehicle. In some implementations, an event recorder may identify vehicle events and/or other information related to the operation of a vehicle based on previously stored information. For example, the previously stored information may be based on output signals generated days, weeks, months or more ago.

As used herein, the term "vehicle event" may refer to forward motion, motion in reverse, making a turn, speeding, unsafe driving speed, collisions, near-collisions, driving in a parking lot or garage, being stalled at a traffic light, loading and/or unloading of a vehicle, transferring gasoline to or from the vehicle, and/or other vehicle events in addition to driving maneuvers such as swerving, a U-turn, freewheeling, over-revving, lane-departure, short following distance, imminent collision, unsafe turning that approaches rollover and/or vehicle stability limits, hard braking, rapid acceleration, idling, driving outside a geo-fence boundary, crossing double-yellow lines, passing on single-lane roads, a certain number of lane changes within a certain amount of time or distance, fast lane change, cutting off other vehicles during lane-change speeding, running a red light, running a stop sign, parking a vehicle, performing fuel-inefficient maneuvers, and/or other driving maneuvers or combinations thereof. Some types of vehicle events may be based on the actions or motion of the vehicle itself. Other types of vehicle events may be based on the actions taken or performed by a vehicle operator. Some types of vehicle events may be based on a combination of both the actions or motion of the vehicle itself and the actions taken or performed by a vehicle operator. For example, a particular vehicle event may include hard braking followed (within a predetermine window of time) by a sharp turn and/or swerve. This particular vehicle event may indicate a near-collision that was severe enough that the vehicle operator decided that merely braking hard would not be sufficient to avoid the collision. Another example of a vehicle event that includes a combination of actions may be a lane change followed (within a predetermine window of time) by hard braking, which may indicate a poor decision to initiate the lane change.

The one or more processors of the remote computing server and/or of individual sets of resources may be configured to execute one or more computer program components. The computer program components may include one or more of a presentation component, an interface component, a distribution component, a code component, a local result component, a centralized result component, a parameter determination component, a detection component, a storage component, a monetization component, and/or other components.

The presentation component may be configured to facilitate presentation of user interfaces, reports, and/or results to users, third parties, and/or vehicle operators. In some implementations, the presentation component may facilitate presentation of a user interface to a user of the remote computing server. In some implementations, the presentation component may facilitate presentation of one or more user interfaces to one or more vehicle operators. In some implementations, the presentation component may facilitate presentation of one or more reports, results, and/or user interfaces to a third party.

The interface component may be configured to facilitate interaction with users. For example, the interface component may facilitate interaction through user interfaces. For example, the interface component may receive user input through a user interface. In some implementations, the interface component may receive user input from the user of a remote computing server. In some implementations, the interface component may receive user input from vehicle operators. In some implementations, the interface component may receive user input from a third party.

The distribution component may be configured to transmit information from the remote computing server to all or part of a fleet of vehicles. In some implementations, the distribution component may be configured to transmit information from the remote computing server to all or part of the transceivers that are included in and/or carried by a fleet of vehicles. In some implementations, transmission may be wireless. In some implementations, transmission may be point-to-point. In some implementations, transmission may be broadcast. In some implementations, transmission may be bi-directional. For example, the distribution component may be configured to transmit queries and/or executable code from the remote computing server to individual vehicles in a fleet, e.g., based on the current locations of the individual vehicles. For example, individual transceivers may be configured to receive queries and/or executable code transmitted by the distribution component. In some implementations, the presentation component, interface component, and/or one or more other components of the system may be configured to determine and/or present one or both of warnings and/or recommendations to a vehicle operator.

The code component may be configured to obtain executable code from a user, a third party, and/or from a source external to the system. In some implementations, executable code may represent a query and/or an algorithm. In some implementations, executable code may include one or more function calls to a standardized Application Program Interface or API. The one or more function calls may be associated with functions that operate on information related to vehicles, including but not limited to the operation of vehicles and/or the surroundings of vehicles. In some implementations, the standardized API may include different subsets (e.g., different subsets of functions). The system may be configured to control access by executable code to one or more particular subsets of the standardized API. For example, a first subset of functions of the standardized API may be accessible to the executable code of a particular third party, and a second subset of functions of the standardized API may be inaccessible to the executable code of the particular third party, at the same time. For example, the first subset and the second subset may be mutually exclusive. In some implementations, the executable code may include definitions and/or algorithms for particular vehicle events, particular maneuvers of vehicles, particular conditions of vehicle operators, and/or other information.

The local result component may be configured to execute executable code locally on one or more individual vehicles. For example, the local result component may be configured to execute executable code to produce a result. Additionally, the set of resources on an individual vehicle may be configured to transmit produced results to the remote computing server.

The centralized result component may be configured to receive, aggregate, and/or otherwise process one or more results received from individual vehicles, including but not limited to results produced locally by local result components of individual vehicles. In some implementations, the centralized result component may be located at the remote computing server.

The parameter determination component may be configured to determine current operating conditions and/or vehicle parameters. The parameter determination component may determine current operating conditions and/or vehicle parameters based on the information conveyed by the output signals from the sensors and/or other information.

The one or more current operating conditions may be related to the vehicle, the operation of the vehicle, physical characteristics of the vehicle, and/or other information. In some implementations, the parameter determination component may be configured to determine one or more of the current operating conditions one or more times in an ongoing manner during operation of the vehicle. In some implementations, the parameter determination component may be configured to determine one or more of the parameters one or more times in an ongoing manner during operation of the vehicle.

The detection component may be configured to detect vehicle events. In some implementations, vehicle events may be related to current operating conditions of a vehicle. In some implementations, vehicle events may be related to the surroundings of a vehicle. In some implementations, vehicle events may be related to the operator of a vehicle. For example, a vehicle event may be based on comparing one or more vehicle parameters with one or more thresholds.

The storage component may be configured to store information in electronic storage. For example, the information may be stored in the electronic storage of a particular vehicle. In some implementations, the stored information may be related to detected vehicle events, determined vehicle parameters, executable code, and/or other information. In some implementations, the storage component may be configured to store vehicle event records of detected vehicle events in electronic storage.

The monetization component may be configured to exchange access by executable code to at least a part of the fleet for compensation. For example, the results from running executable code may be provided to the user and/or the third party in exchange for compensation.

In some implementations, one or more components of the system may be configured to obtain, receive, and/or determine contextual information related to environmental conditions near and/or around vehicles. Environmental conditions may be related to weather conditions, traffic conditions, visibility, and/or other environmental conditions. In some implementations, one or more environmental conditions may be received from one or more sources external to the vehicle. For example, a source external to the vehicle may include an external provider.

In some implementations, detection of vehicle events may further be based one or more types of contextual information. In some implementations, detection may be accomplished and/or performed at the vehicle.

As used herein, any association (or relation, or reflection, or indication, or correspondency) involving vehicles, sensors, vehicle events, operating conditions, parameters, thresholds, functions, notifications, discrepancies, location-specific features, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other objects, features, and characteristics of the servers, systems, and/or methods disclosed herein, as well as the methods of operation and functions of the related elements of structure and the combination of parts and economies of manufacture, will become more apparent upon consideration of the following description and the appended claims with reference to the accompanying drawings, all of which form a part of this disclosure, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 4A-4B illustrate a method to use data-processing resources carried by a fleet of vehicles as a distributed data center to query the fleet of vehicles, in accordance with one or more embodiments.

DETAILED DESCRIPTION

Figure 1:
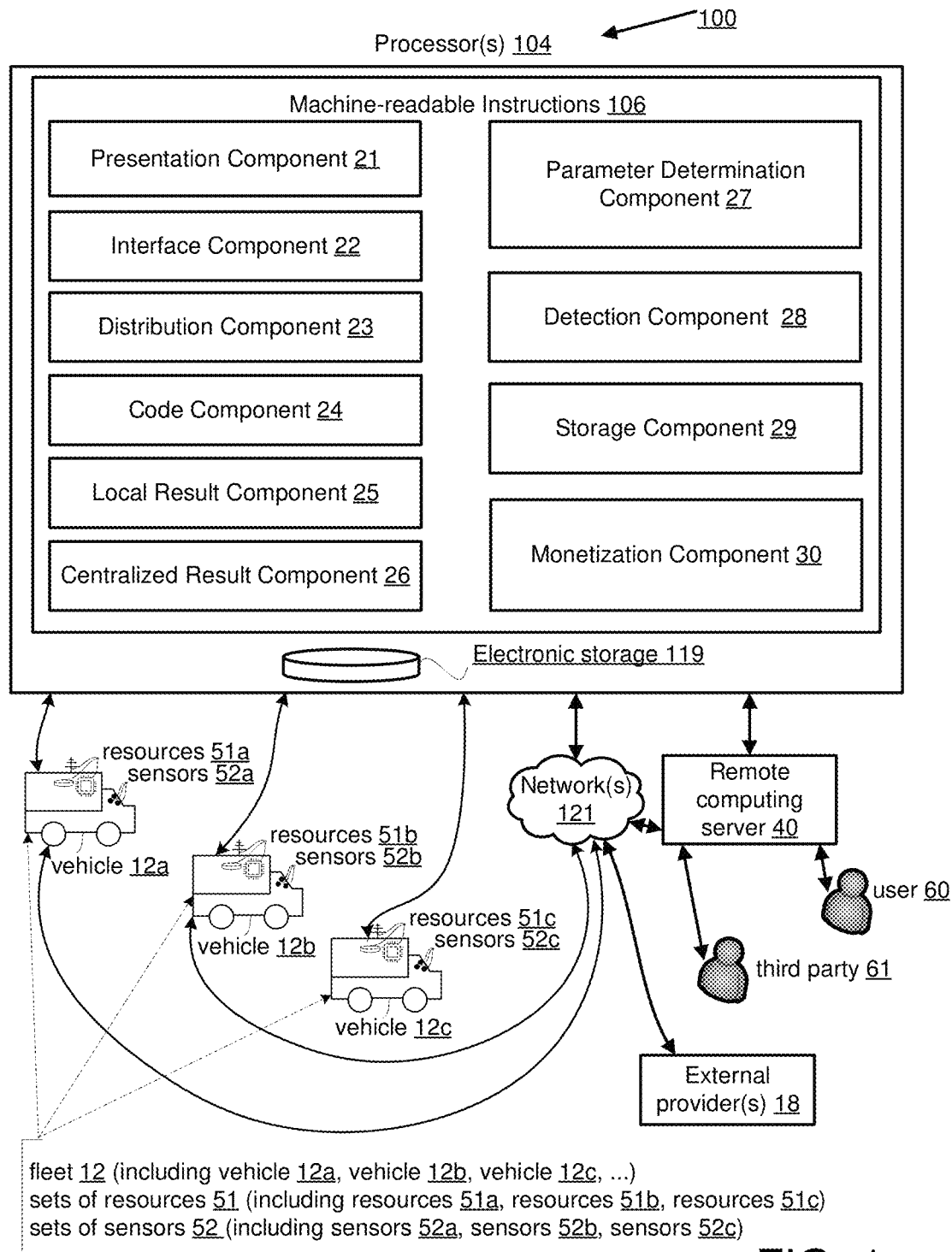
FIGS. 1-2 illustrate systems configured to use data-processing resources carried by a fleet of vehicles as a distributed data center to query the fleet of vehicles, in accordance with one or more embodiments.

FIG. 1 illustrates a system 100 configured to use data-processing resources carried by a fleet 12 of vehicles as a distributed data center to query fleet 12 of vehicles. Fleet 12 may include a first vehicle 12a, a second vehicle 12b, a third vehicle 12c, and so forth. As used here, the term fleet may refer to a set of at least 5 vehicles, at least 10 vehicles, at least 100 vehicles, at least 1000 vehicles, and/or another number of vehicles. Individual vehicles may include a set of resources for data processing and/or electronic storage, including but not limited to persistent storage. Individual vehicles may include a set of sensors configured to generate output signals conveying information related to the operation of the individual vehicles. System 100 may include sets of resources 51, sets of sensors 52, a remote computing server 40, electronic storage 119, and/or other components. In some implementations, system 100 may be a distributed data center, include a distributed data center, or act as a distributed data center.

One or more components of system 100 may include one or more processors 104 and/or other mechanisms/components for processing information. For example, a set of resources included in and/or carried by an individual vehicle may include one or more processors. For example, remote computing server 40 may include one or more processors. In some implementations, other vehicle-specific components, such as, by way of non-limiting example, a vehicle event recorder, may include one or more processors. In some implementations, some or all of the processors may be configured via machine-readable instructions to perform various functions. One or more components of system 100 may include electronic storage 119 and/or other mechanisms/components for storing information. For example, a set of resources included in and/or carried by an individual vehicle may include electronic storage. For example, remote computing server 40 may include electronic storage. In some implementations, other vehicle-specific components, such as, by way of non-limiting example, a vehicle event recorder, may include electronic storage.

Figure 2:
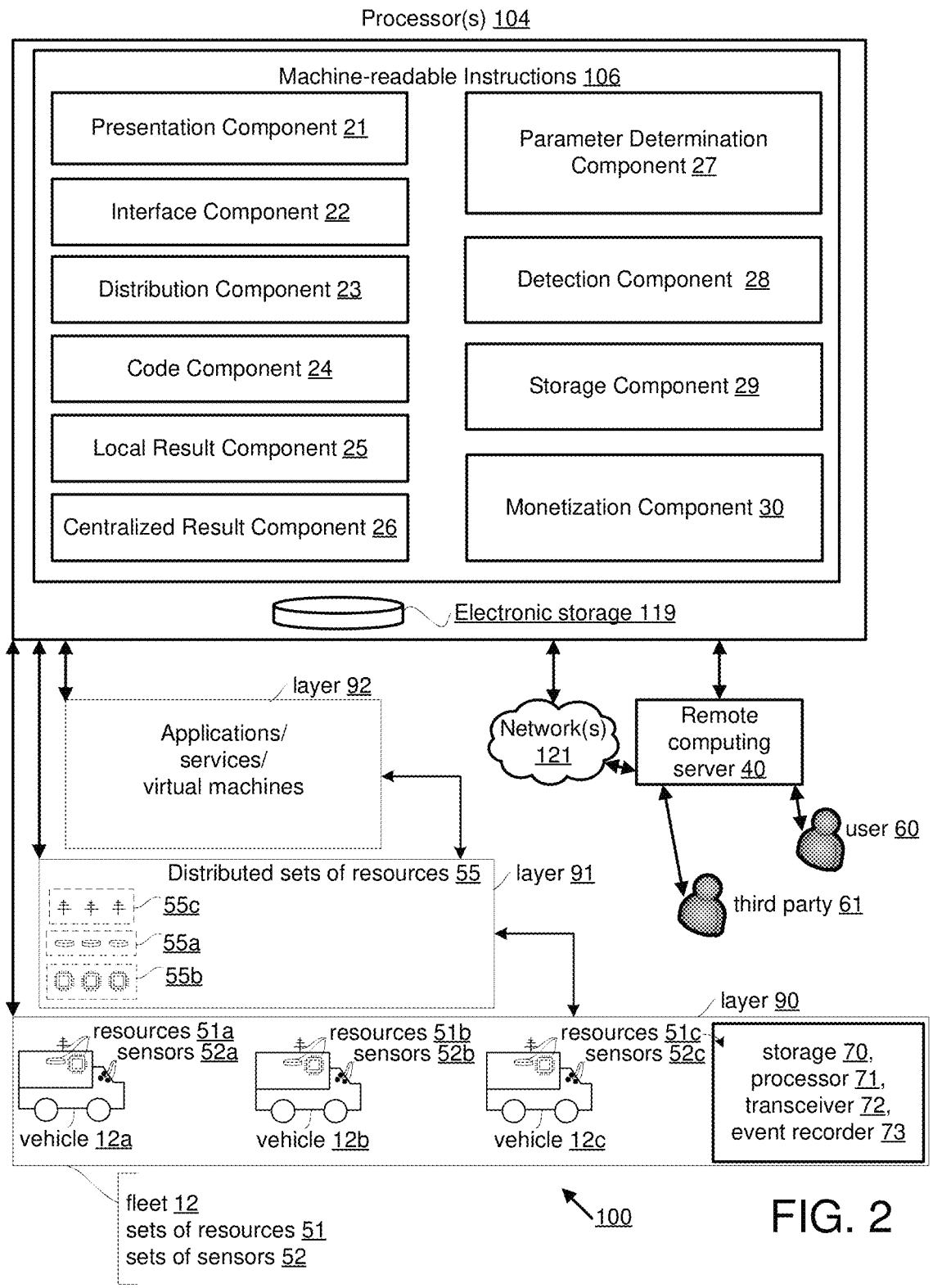

By way of non-limiting example, as shown in FIG. 2, individual sets of resources 51 included in and/or carried by an individual vehicle (e.g. set of resources 51*c* carried by vehicle 12*c*) may include one or more of electronic storage 70, a processor 71, a transceiver 72, an event recorder 73, and/or other components. First vehicle 12*a* may carry a first set of resources 51*a*. Second vehicle 12*b* may carry a second set of resources 51*b*. Third vehicle 12*c* may carry a third set of resources 51*c*, and so forth. Each set of resources may include instances of one or more of electronic storage 70, a processor 71, a transceiver 72, an event recorder 73, and/or other components. First set of resources 51*a* may include a first transceiver. Second set of resources 51*b* may include a second transceiver, and so forth. For example, first set of resources 51*a* may include first electronic storage, second set of resources 51*b* may include second electronic storage, third set of resources 51*c* may include third electronic storage (e.g., storage 70), and so forth. For example, first set of resources 51*a* may include one or more processors, second set of resources 51*b* may include one or more processors, third set of resources 51*c* may include one or more processors (e.g., processor 71), and so forth.

Transceivers may be configured to transfer and/or receive information to and/or from other elements of system 100, including but not limited to other vehicles (or components carried by other vehicles in fleet 12), remote computing server 40, a user 60, a third party 61, and/or other components. In some implementations, transceivers may be configured to transfer and/or receive information wirelessly, and/or otherwise provide information-distribution resources. For example, a transceiver may be configured to receive executable code, such as code that includes and/or represents a definition of a particular vehicle event, a particular maneuver of a vehicle, and/or a particular condition of a vehicle operator of a vehicle. In some implementations, transceivers may be configured to obtain, receive, measure, and/or otherwise determine one or more conditions related to data transmissions. For example, one or more current local data transmission conditions may include a current bandwidth (e.g., in MB/s), a current transmission protocol (e.g., LTE, 3G, 4G, 5G, Wi-Fi, etc.), a current transmission cost (e.g., in $/MB), and/or other conditions.

Referring to FIG. 1, a set of sensors 52 may be configured to generate output signals conveying information. In some implementations, the generated information may be related to the operation of one or more vehicles in fleet 12. In some implementations, the generated information may be related to the surroundings of one or more vehicles in fleet 12. An individual set of sensors 52 may be carried by an individual vehicle. First vehicle 12*a* may carry a first set of sensors 52*a*. Second vehicle 12*b* may carry a second set of sensors 52*b*. Third vehicle 12*c* may carry a third set of sensors 52*c*, and so forth. The generated information may include timing information, location information, operator information, and/or other information. In some implementations, generated information may be associated with timing information (e.g., from a timer), location information, operator information, and/or other information.

In some implementations, timing information may associate and/or otherwise relate the generated output signals with one or more moments of generation by one or more particular sensors. For example, timing information may include time stamps that indicate moments of generation. For example, at a time labeled $t_1$ the speed of a vehicle may be 50 mph, at a time labeled $t_2$ the speed may be 55 mph, and so forth. A set of time stamps or moments in time may form a timeline. In some implementations, location information may associate and/or otherwise relate the generated output signals with one or more locations of generation (or, locations at the moment of generation) by one or more particular sensors. In some implementations, the operator information may associate and/or otherwise relate the generated output signals with individual vehicle operators at the moments of generation. For example, a particular sensor may generate a particular output signal conveying a particular operating parameter of an individual vehicle, such as speed and/or another operating parameter. The particular output signal may include and/or be associated with a timestamp (e.g., time=$t_x$) that indicates when the particular output signal was generated. For example, a series of output signals may be associated with a corresponding series of timestamps. In some implementations, the particular output signal may be associated with a particular vehicle operator. For example, the particular output signal may be associated with the particular vehicle operator that was operating the individual vehicle at the time the particular output signal was generated. In some implementations, a set of resources 51 may be configured to store generated information, timing information, location information, operator information, and/or other information, e.g. in electronic storage. In some implementations, information may be stored after compression, filtering, and/or other processing to reduce the required amount of storage space.

A sensor may be configured to generate output signals conveying information related to the operation of a vehicle. Information related to the operation of a vehicle may include feedback information from one or more of the mechanical systems of the vehicle, and/or other information. In some implementations, at least one of the sensors may be a vehicle system sensor included in an engine control module (ECM) system or an electronic control module (ECM) system of the vehicle. The sensors of a particular vehicle may be referred to as a set of sensors. An individual sensor is vehicle-specific.

Information related to current operating conditions of a vehicle may include feedback information from one or more of the mechanical systems of the vehicle, the electrical systems of the vehicle, and/or other information. The mechanical systems of a vehicle may include, for example, the engine, the drive train, the lighting systems (e.g., headlights, brake lights), the braking system, the transmission, fuel delivery systems, and/or other mechanical systems. The mechanical systems of a vehicle may include one or more mechanical sensors, electronic sensors, and/or other sensors that generate the output signals (e.g., seat belt sensors, tire pressure sensors, etc.). In some implementations, at least one of the sensors carried by a vehicle may be a vehicle system sensor included in an ECM system of the vehicle.

In some implementations, information related to current operating conditions of a vehicle may include information related to the environment in and/or around the vehicle. The vehicle environment may include spaces in and around an interior and an exterior of the vehicle. The information may include information related to movement of the vehicle, an orientation of the vehicle, a geographic position of the vehicle, a spatial position of the vehicle relative to other objects, a tilt angle of the vehicle, an inclination/declination angle of the vehicle, and/or other information. In some implementations, the output signals conveying information may be generated via non-standard aftermarket sensors installed in the vehicle. Non-standard aftermarket sensors may include, for example, a video camera, a microphone, an accelerometer, a gyroscope, a geolocation sensor (e.g., a GPS device), a radar detector, a magnetometer, radar (e.g. for measuring distance of leading vehicle), and/or other sensors. In some implementations, the set of sensors carried by a vehicle may include multiple cameras positioned around the vehicle and synchronized together to provide a 360-degree view of the interior of the vehicle (e.g., the cabin) and/or a 360-degree view of the exterior of the vehicle.

Although individual sets of sensors 52a, 52b, and 52c are depicted in FIG. 1 as having three elements, this is not intended to be limiting. For individual vehicles, a set of sensors 142 may include one or more sensors located adjacent to and/or in communication with the various mechanical systems of the vehicle, in one or more positions (e.g., at or near the front of the vehicle, at or near the back of the vehicle, on the side of the vehicle, on or near the windshield of the vehicle, facing outward and/or inward, etc.) to accurately acquire information representing the vehicle environment (e.g. visual information, spatial information, orientation information), and/or in other locations. For example, in some implementations, a set of sensors for a particular vehicle may be configured such that a first sensor is located near or in communication with a rotating tire of the vehicle, and a second sensor located on top of the vehicle is in communication with a geolocation satellite.

Individual sensors may be configured to generate output signals conveying information. The information may include visual information, motion-related information, position-related information, biometric information, heat-related information, infra-red information, and/or other information. In some implementations, one or more components of system 100 may determine one or more parameters that are measured, derived, estimated, approximated, and/or otherwise determined based on one or more output signals generated by one or more sensors.

Output signals generated by individual sensors (and/or information based thereon) may be stored and/or transferred in electronic files. In some implementations, output signals generated by individual sensors (and/or information based thereon) may be streamed to one or more other components of system 100.

Individual sensors may include image sensors, cameras, and/or other sensors. Individual sensors may be configured to capture information, including but not limited to visual information, video information, audio information, heat information, geolocation information, orientation and/or motion information, depth information, and/or other information. Information captured by one or more sensors may be marked, timestamped, annotated, and/or otherwise processed such that information captured by other sensors can be synchronized, aligned, annotated, and/or otherwise associated therewith. For example, video information captured by an image sensor may be synchronized with information captured by an accelerometer, GPS unit, or other sensor. Output signals generated by individual image sensors (and/or information based thereon) may be stored and/or transferred in electronic files.

System 100 may be coupled to individual vehicles. For example, system 100 may be communicatively coupled to individual vehicles and/or to components carried by individual vehicles, including but not limited to transceivers. For example, components of system 100 may be configured to communicate through one or more networks 121. The one or more networks 121 may, by way of non-limiting example, include the internet.

Remote computing server 40 may include one or more processors 104. Remote computing server 40 may be remote, separate, and/or discrete from the fleet of vehicles 12. Remote computer server 40 may be physically unconnected to any vehicle in the fleet. One or more processors 104 may be configured via machine-readable instructions 106 to perform various functions. Remote computing server 40 may be configured to facilitate presentation of a user interface to user 60 of remote computing server 40 and/or third party 61. The user interface may be configured to facilitate interaction between one or more users and remote computing server 40. For example, the user interface may be configured to receive user input from user 60 and/or third party 61. In some implementations, the received input may represent executable code, which may include one or more queries, definitions, and/or algorithms for particular vehicle events, particular maneuvers of vehicles, and/or particular conditions of vehicle operators. In some implementations, the received input may represent a query, e.g. a distributed query. The query may be related to information stored on electronic storage, e.g. in multiple sets of resources of multiple vehicles. Alternatively, and/or simultaneously, a query may be related to one or more vehicle operators. Remote computing server 40 may be further configured to transmit information (e.g., executable code, and/or a query) to some vehicles in the fleet or to all vehicles of the fleet. Results and/or other responses from individual vehicles may be received, aggregated, and/or presented by remote computing server 40.

Figure 3:
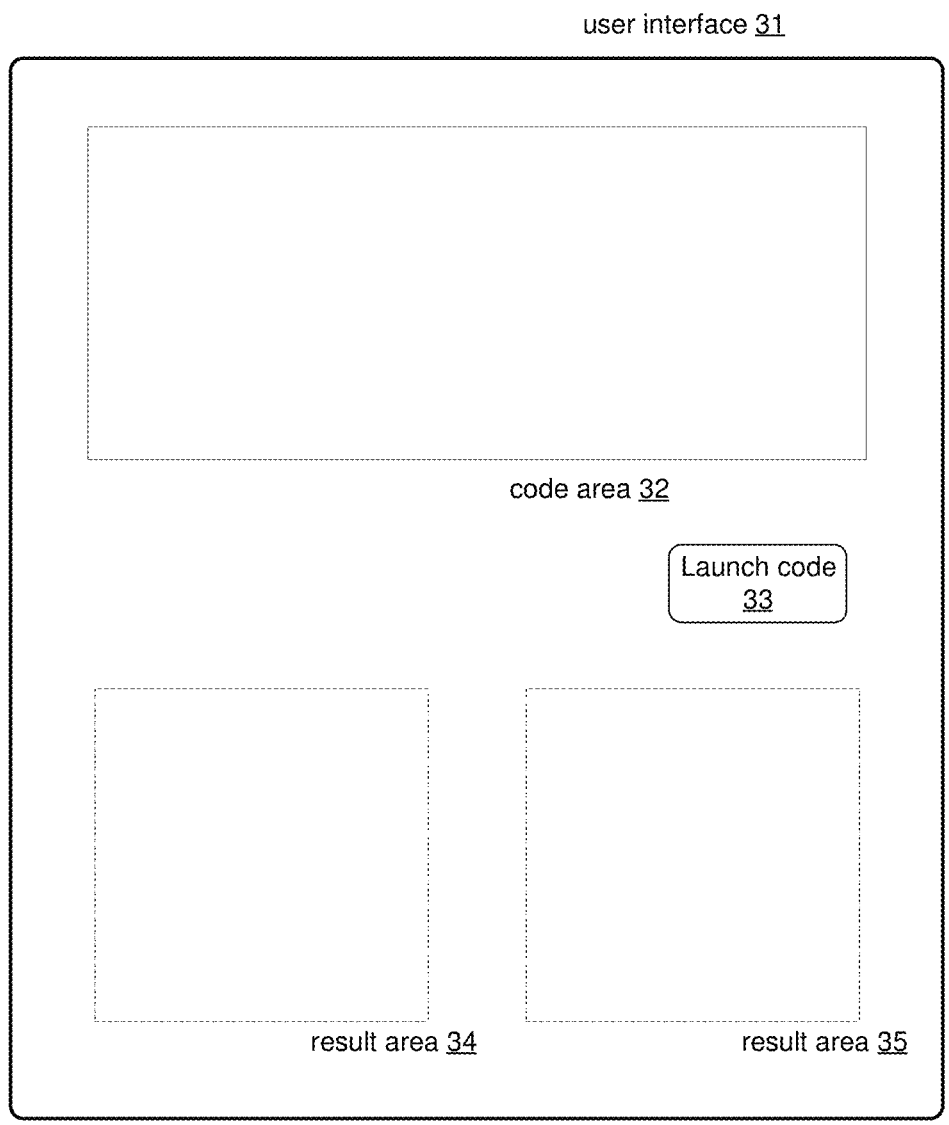
FIG. 3 illustrates an exemplary interface to be used with a system configured to use data-processing resources carried by a fleet of vehicles as a distributed data center to query the fleet of vehicles, in accordance with one or more embodiments.

By way of non-limiting example, FIG. 3 illustrates a user interface 31 to be used with system 100 to query fleet 12 of vehicles. By way of non-limiting example, user interface 31 may include a code area 32 used to enter and/or select code elements that form executable code. User interface may include a launch code button 33 that, upon selection, facilitates distribution of the executable code in code area 32 to one or more vehicles in a fleet. User interface 31 may include a first result area 34, a second result area 35, and/or other user interface elements. In some implementations, first result area 34 may be used to present one or more results produced by execution of the executable code from code area 32. In some implementations, second result area 35 may be used to present one or more results produced by execution of alternative code that is different from the executable code from code area 32. For example, first result area 34 and second result area 35 may be used by a user, a third party, and/or manual reviewer to support A/B testing between different algorithms to detect similar events, e.g. to determine algorithm performance under controlled conditions (e.g., a default algorithm to detect a fatigued driver and an alternative algorithm to detect a fatigued driver).

Referring to FIG. 2, in some implementations, a set of resources included in and/or carried by an individual vehicle may include an event recorder (also referred to as vehicle event recorder). For example, set of resources 51c carried by the vehicles may include event recorder 73, as shown in FIG. 2. An event recorder may be configured to generate, detect, identify, capture, and/or record information related to the operation of a vehicle. Information related to a vehicle may include, by way of non-limiting example, information related to and/or based on vehicle events. An event recorder may be configured to off-load and/or otherwise transmit information (e.g. through use of a transceiver such as transceiver 72). In some implementations, an event recorder may include one or more physical processors, electronic storage, and/or other components. In some implementations, an event recorder may detect vehicle events based on a comparison of the information conveyed by the output signals from one or more sensors to predetermined (variable and/or fixed) values, threshold, functions, and/or other information. In some implementations, detections by the event recorder may be based, at least in part, on information included in executable code and/or other received information. An event recorder may identify vehicle events in real-time or near real-time during operation of a vehicle.

In some implementations, system 100 may be configured to effectuate management of distributed sets of resources 55. In some implementations, an individual distributed set of resources may include resources of the same or similar type. For example, a first distributed set of resources 55a may include resources for electronic storage of information, a second distributed set of resources 55b may include resources that provide information-processing capabilities, a third distributed set of resources 55c may include resources that provide information-distribution capabilities, and so forth. For example, the resources for electronic storage of information may include a first data store (included in first set of resources 51a for the first vehicle), a second data store (included in the second set of resources 51b for the second vehicle), a third data store (included in the third set of resources 51c for the third vehicle), and so forth. For example, system 100 may be configured to manage a distributed data store that includes data stored in the first data store, the second data store, the third data store, and so forth. In some implementations, virtualization component 30 may be configured to effectuate management of different layers of virtualization of resources. For example, the lowest layer 90 may include the physical resources, a next layer 91 may include the distributed sets of resources, and another next layer 92 may include distributed APIs, distributed applications, and/or services available to users of remote computing server 40. The distributed API, application, and/or service layer may include support for different functions, services, and/or for different operating systems, e.g. through virtual machines. In some implementations, virtualization component 40 may be configured to support different types of virtualization, including but not limited to server virtualization, desktop virtualization, application virtualization, network virtualization, storage virtualization, and/or other types of virtualization.

Referring to FIG. 1, one or more processors 104 of remote computing server 40 and/or of individual sets of resources 51 may be configured to execute one or more computer program components. The computer program components may include one or more of a presentation component 21, an interface component 22, a distribution component 23, a code component 24, a local result component 25, a centralized result component 26, a parameter determination component 27, a detection component 28, a storage component 29, a monetization component 30, and/or other components.

Presentation component 21 may be configured to facilitate presentation of user interfaces, reports, and/or results to users, third parties, and/or vehicle operators. In some implementations, presentation component 21 may facilitate presentation of a user interface to user 60 of remote computing server 40. In some implementations, presentation component 21 may facilitate presentation of a user interface to one or more vehicle operators. In some implementations, presentation component 21 may facilitate presentation of one or more reports, results, and/or user interfaces to third party 61. This enables information to be communicated between a vehicle operator and/or other components of system 100. As an example, a warning regarding a dangerous driving maneuver and/or vehicle event may be displayed to the driver of the vehicle via such a user interface, e.g. as a notification. Presentation component 21 enables information to be communicated between third party 61, user 60, and/or other components of system 100.

Examples of interface devices suitable for inclusion in a user interface include a keypad, buttons, switches, a keyboard, knobs, levers, a display screen, a touch screen, speakers, a microphone, an indicator light, an audible alarm, a printer, a tactile feedback device, and/or other interface devices. It is to be understood that other communication techniques, either hard-wired or wireless, are also contemplated by the present disclosure as a user interface. Other exemplary input devices and techniques adapted for use by users and/or vehicle operators include, but are not limited to, an RS-232 port, RF link, an IR link, modem (telephone, cable, and/or other modems), a cellular network, a Wi-Fi network, a local area network, and/or other devices and/or systems. In short, any technique for communicating information is contemplated by the present disclosure as a user interface.

Interface component 22 may be configured to facilitate interaction with users and/or vehicle operators. For example, a user may be a fleet manager, or someone investigating fleet operations. Interface component 22 may facilitate interaction through user interfaces. For example, interface component 22 may receive user input through a user interface. In some implementations, interface component 22 may receive user input from user 60 of remote computing server 40. In some implementations, interface component 22 may receive user input from third party 61, e.g. via remote computing server 40. In some implementations, the received user input may represent a distributed query, executable code, and/or other information. For example, an entire fleet of vehicles 12 (or any subset thereof) may be queried for particular information. In some implementations, a distributed query or other request may be associated with one or more response constraints. For example, distribution component 23 may be configured to transmit the one or more response constraints to all or part of fleet of vehicles 12.

In some implementations, interface component 22 may be configured to effectuate a review presentation to a user or reviewer, e.g. user 60. A review presentation may be based on information related to one or more detected vehicle events. In some implementations, a review presentation may provide a prompt to a user or reviewer to provide manual review input, e.g., regarding one or more detected vehicle events. For example, a reviewer may be prompted via a question, an inquiry, and/or via other types of prompts. For example, a reviewer may be asked whether a driver was wearing a seatbelt at a particular point in time, or whether one or more lanes appear to be closed. A review presentation may be implemented as a user interface to facilitate interaction for a reviewer. For example, such a user interface may receive review input from a reviewer, including but not limited to manual review input. In some implementations, review input may be responsive to a prompt. In some implementations, a vehicle operator may receive information based on review input. Such information may be referred to as feedback. For example, a user interface for a vehicle operator (this may be referred to as a driver interface) may present a message to a vehicle operator to "remember to wear your seatbelt," responsive to particular review input received from a reviewer (through a different user interface). In some implementations, a driver interface may be configured to detect a vehicle operator's response and/or reaction to specific feedback. In some implementations, the response and/or reaction by a vehicle operator may be specific to the feedback received through the driver interface. In some implementations, review input may be used to update and/or change a vehicle event report.

Distribution component 23 may be configured to transmit information from remote computing server 40 to all or part of fleet of vehicles 12. In some implementations, distribution component 23 may be configured to transmit information from remote computing server 40 to all or part of the transceivers that are included in and/or carried by fleet of vehicles 12. In some implementations, transmission may be wireless. In some implementations, transmission may be point-to-point. In some implementations, transmission may be broadcast. In some implementations, transmission may be bi-directional. For example, distribution component 23 may be configured to transmit executable code from remote computing server 40 to individual vehicles in a fleet, e.g., based on the current locations of the individual vehicles. For example, distribution component 23 may be configured to transmit query information from remote computing server 40 to some or all of the vehicles in fleet 12. In some implementations, presentation component 21, interface component 22, and/or one or more other components of system 100 may be configured to determine and/or present one or both of warnings and/or recommendations to a vehicle operator, wherein the warnings and/or recommendations are determined based on detected vehicle events and/or other information.

Code component 24 may be configured to obtain executable code from user 60, third party 61, and/or from a source external to system 100. In some implementations, executable code may represent a query and/or an algorithm. In some implementations, executable code may include one or more function calls to a standardized Application Program Interface or API. In some implementations, the standardized API may be stored in electronic storage, including but not limited to electronic storage 119. The one or more function calls may be associated with functions that operate on information related to vehicles, including but not limited to the operation of vehicles and/or the surroundings of vehicles. In some implementations, the standardized API may include different subsets (e.g., different subsets of functions). System 100 may be configured to control access by executable code to one or more particular subsets of the standardized API. For example, a first subset of functions of the standardized API may be accessible to the executable code of a particular third party, and a second subset of functions of the standardized API may be inaccessible to the executable code of the particular third party, at the same time. For example, the first subset and the second subset may be mutually exclusive. In some implementations, the executable code may include definitions and/or algorithms for particular vehicle events, particular maneuvers of vehicles, particular conditions of vehicle operators, and/or other information. The extent of which subsets and/or which functions are accessible and/or available may be controlled and/or limited contractually, e.g. as based on compensation paid by third party 61. In some implementations, code component 24 may be configured to receive executable code from user 60 and/or third party 61.

Local result component 25 may be configured to execute executable code locally on one or more individual vehicles. For example, local result component 25 may be configured to execute executable code to produce a result. In some implementations, produced result may be stored locally per vehicle for future usage. Additionally, the set of resources on an individual vehicle may be configured to transmit produced results to remote computing server 40. In some implementations, local result component 25 may be configured to execute executable code on previously stored information for an individual vehicle, including but not limited to previously detected vehicle events and/or other stored vehicle-specific information. Alternatively, and/or simultaneously, in some implementations, local result component 25 may be configured to execute executable code over time and/or in an ongoing manner during operation of an individual vehicle. For example, the executable code may include definitions and/or algorithms for new and/or improved vehicle events which may be detected during operation of the individual vehicle, e.g., in real-time or near real-time. Occurrences of one or more detected vehicle events may be stored locally and/or reported as soon as possible (e.g., immediately subsequent to detection) and/or reported at predefined times (e.g., once a week, or once a month). In other words, the detection of vehicle events based on information included in executable code may be backward-looking and/or forward-looking.

In some implementations, local result component 25 and/or an individual set of resources may be configured to execute the executable code in a testing environment. The testing environment may limit access of the executable code to a predefined subset of the individual set of resources, such that elements of the individual set of resources that are not within the predefined subset are protected from being accessed and/or corrupted. In some implementations, the testing environment may be a so-called sandbox.

Centralized result component 26 may be configured to receive, aggregate, and/or otherwise process one or more results received from individual vehicles, including but not limited to results produced locally by local result components of individual vehicles. In some implementations, centralized result component 26 may be located at remote computing server 40.

Parameter determination component 27 may be configured to determine current operating conditions and/or vehicle parameters. Parameter determination component 27 may determine current operating conditions and/or vehicle parameters based on the information conveyed by the output signals from the sensors and/or other information. The one or more current operating conditions may be related to the vehicle, the operation of the vehicle, physical characteristics of the vehicle, and/or other information. In some implementations, parameter determination component 27 may be configured to determine one or more of the current operating conditions one or more times in an ongoing manner during operation of the vehicle.

In some implementations, operating conditions may include vehicle parameters. For example, vehicle parameters may be related to one or more of an acceleration, a direction of travel, a turn diameter, a vehicle speed, an engine speed (e.g. RPM), a duration of time, a closing distance, a lane departure from an intended travelling lane of the vehicle, a following distance, physical characteristics of the vehicle (such as mass and/or number of axles, for example), a tilt angle of the vehicle, an inclination/declination angle of the vehicle, and/or other parameters.

The physical characteristics of a vehicle may be physical features of a vehicle set during manufacture of the vehicle, during loading of the vehicle, and/or at other times. For example, the one or more vehicle parameters may include a vehicle type (e.g., a car, a bus, a semi-truck, a tanker truck), a vehicle size (e.g., length), a vehicle weight (e.g., including cargo and/or without cargo), a number of gears, a number of axles, a type of load carried by the vehicle (e.g., food items, livestock, construction materials, hazardous materials, an oversized load, a liquid), vehicle trailer type, trailer length, trailer weight, trailer height, a number of axles, and/or other physical features.

In some implementations, parameter determination component 27 may be configured to determine one or more vehicle parameters based on the output signals from at least two different sensors. For example, parameter determination component 27 may determine one or more of the vehicle parameters based on output signals from a sensor related to the ECM system and an external aftermarket added sensor. In some implementations, a determination of one or more of the vehicle parameters based on output signals from at least two different sensors may be more accurate and/or precise than a determination based on the output signals from only one sensor. For example, on an icy surface, output signals from an accelerometer may not convey that a driver of the vehicle is applying the brakes of the vehicle. However, a sensor in communication with the braking system of the vehicle would convey that the driver is applying the brakes. A value of a braking parameter may be determined based on the braking sensor information even though the output signals from the accelerometer may not convey that the driver is applying the brakes.

Parameter determination component 27 may be configured to determine vehicle parameters that are not directly measurable by any of the available sensors. For example, an inclinometer may not be available to measure the road grade, but vehicle speed data as measured by a GPS system and/or by a wheel sensor ECM may be combined with accelerometer data to determine the road grade. If an accelerometer measures a force that is consistent with braking, but the vehicle speed remains constant, the parameter component can determine that the measured force is a component of the gravity vector that is acting along the longitudinal axis of the vehicle. By using trigonometry, the magnitude of the gravity vector component can be used to determine the road grade (e.g., pitch angle of the vehicle in respect to the horizontal plane).

In some implementations, one or more of the vehicle parameters may be determined one or more times in an ongoing manner during operation of the vehicle. In some implementations, one or more of the vehicle parameters may be determined at regular time intervals during operation of the vehicle. The timing of the vehicle parameter determinations (e.g., in an ongoing manner, at regular time intervals, etc.) may be programmed at manufacture, obtained responsive to user entry and/or selection of timing information via a user interface and/or a remote computing device, and/or may be determined in other ways. The time intervals of parameter determination may be significantly less (e.g. more frequent) than the time intervals at which various sensor measurements are available. In such cases, parameter determination component 27 may estimate vehicle parameters in between the actual measurements of the same vehicle parameters by the respective sensors, to the extent that the vehicle parameters are measurable. This may be established by means of a physical model that describes the behavior of various vehicle parameters and their interdependency. For example, a vehicle speed parameter may be estimated at a rate of 20 times per second, although the underlying speed measurements are much less frequent (e.g., four times per second for ECM speed, one time per second for GPS speed). This may be accomplished by integrating vehicle acceleration, as measured by the accelerometer sensor where the measurements are available 1000 times per second, across time to determine change in speed that is accumulated over time again for the most recent vehicle speed measurement. The benefit of these more frequent estimates of vehicle parameters are many and they include improved operation of other components of system 100, reduced complexity of downstream logic and system design (e.g., all vehicle parameters are updated at the same interval, rather than being updating irregularly and at the interval of each respective sensor), and more pleasing (e.g., "smooth") presentation of vehicle event recorder data through a user interface.

Detection component 28 may be configured to detect vehicle events. In some implementations, vehicle events may be related to current operating conditions of a vehicle. In some implementations, vehicle events may be related to the surroundings of a vehicle. In some implementations, vehicle events may be related to the operator of a vehicle. For example, a vehicle event may be based on comparing one or more vehicle parameters with one or more thresholds. In some implementations, detections may be based on definitions and/or representations of vehicle events, actions and/or conditions of vehicle operators, and/or vehicle maneuvers that are included in executable code. For example, particular executable code from third party 61 may include a definition for the detection of an event that represents an inattentive vehicle operator. Such executable code may be distributed across a fleet of vehicles, and results from the detection of an occurrence of the event that represents an inattentive vehicle operator may be transferred to remote computing server 40, and presented to user 60 and/or third party 61.

For example, particular executable code from third party 61 may include a definition for the detection of an event that represents a fatigued vehicle operator. Such executable code may be distributed across a fleet of vehicles, and results from the detection of an occurrence of the event that represents a fatigued vehicle operator may be transferred to remote computing server 40, and presented to third party 61. For example, third party 61 may test and/or compare different algorithms to detect a fatigued vehicle operator. In some implementations, system 100 may be configured to support A/B testing between different algorithms to detect similar events, e.g. to determine algorithm performance under controlled conditions. In some implementations, results from different algorithms (e.g., a default algorithm to detect a fatigued driver and an alternative algorithm to detect a fatigued driver) may be presented to one or more manual reviewers, e.g. for head-to-head comparisons of one or more results. In some implementations, presentation to reviewers (manual and/or otherwise) may be accomplished through user interfaces. For example, a manual reviewer may be able to enter feedback into a user interface as part of a review.

For example, particular executable code from third party 61 may include a definition for the detection of an event that represents a fuel-inefficient maneuver of a vehicle. Such executable code may be distributed across a fleet of vehicles, and results from the detection of an occurrence of the event that represents a fuel-inefficient maneuver may be transferred to remote computing server 40, and presented to third party 61.

In some implementations, detection component 28 may be configured to detect specific driving maneuvers based on one or more of a vehicle speed, an engine load, a throttle level, an accelerator position, vehicle direction, a gravitational force, and/or other parameters being sustained at or above threshold levels for pre-determined amounts of time. In some implementations, an acceleration and/or force threshold may be scaled based on a length of time an acceleration and/or force is maintained, and/or the particular speed the vehicle is travelling. Detection component 28 may be configured such that force maintained over a period of time at a particular vehicle speed may decrease a threshold force the longer that the force is maintained. Detection component 28 may be configured such that, combined with engine load data, throttle data may be used to determine a risky event, a fuel wasting event, and/or other events.

Storage component 29 may be configured to store information in electronic storage. For example, the information may be stored in the electronic storage of a particular vehicle. In some implementations, the stored information may be related to detected vehicle events, determined vehicle parameters, executable code, and/or other information. In some implementations, storage component 29 may be configured to store vehicle event records of detected vehicle events in electronic storage.

Monetization component 30 may be configured to exchange access by executable code to at least a part of the fleet for compensation. For example, the results from running executable code may be provided to user 60 and/or third party 61 in exchange for compensation.

In some implementations, one or more components of system 100 may be configured to obtain, receive, and/or determine contextual information related to environmental conditions near and/or around vehicles. Environmental conditions may be related to weather conditions, road surface conditions, traffic conditions, visibility, and/or other environmental conditions. In some implementations, environmental conditions may be related to proximity of certain objects that are relevant to driving, including but not limited to traffic signs, railroad crossings, time of day, ambient light conditions, altitude, and/or other objects relevant to driving. In some implementations, contextual information may include a likelihood of traffic congestion near a particular vehicle, and/or near a particular location. In some implementations, contextual information may include a likelihood of the road surface near a particular vehicle and/or a particular location being icy, wet, and/or otherwise potentially having an effect of braking. In some implementations, environmental conditions may include information related to a particular driver and/or a particular trip. For example, with every passing hour that a particular driver drives his vehicle during a particular trip, the likelihood of drowsiness may increase. In some implementations, the function between trip duration or distance and likelihood of drowsiness may be driver-specific.

In some implementations, one or more environmental conditions may be received from one or more sources external to the vehicle. For example, a source external to the vehicle may include one or more external providers 18. For example, contextual information related to weather conditions may be received from a particular external provider 18 that provides weather information. For example, contextual information related to road surface conditions may be received from a particular external provider 18 that provides road condition information. For example, contextual information related to traffic conditions may be received from a particular external provider 18 that provides traffic information.

In some implementations, detection of vehicle events may further be based one or more types of contextual information. In some implementations, detection may be accomplished and/or performed at the vehicle. In some implementations, a value of a current operating condition that effectuates detection of a vehicle event and/or determination of an event type may vary as a function of the contextual information. For example, a speed of 50 mph (in a particular geographical location) may not effectuate detection of a vehicle event and/or determination of an event type when the road surface is dry and/or when traffic is light, but the same speed in the same geographical location may effectuate detection of a vehicle event and/or determination of an event type responsive to contextual information and/or other information indicating that the road surface is wet and/or icy (and/or may be wet and/or icy), or responsive to contextual information (and/or other information) that traffic is heavy (and/or may be heavy). In this example, the contextual information (and/or other information) may have an effect of the detection of vehicle events and/or the determination of event types. In some implementations, contextual information (and/or other information) may modify the sensitivity of the process and/or mechanism by which vehicle events are detected and/or event types are determined. In some implementations, detection of vehicle events and/or determination of event types may be based on one or more comparisons of the values of current operating conditions with threshold values. In some implementations, a particular threshold value may vary as a function of contextual information. In some implementations, a particular threshold value may vary as a function of other information, e.g. as determined based on sensor output.

By way of non-limiting example, lateral forces of about −0.3 g (e.g., swerve left) and/or about +0.3 g (e.g., swerve right) may be a basis used to detect a swerve. In some implementations, the −0.3 g and/or +0.3 g criteria may be used at the vehicle speeds less than about 10 kph. The −0.3 g and/or +0.3 g criteria may be scaled as the vehicle increases in speed. In some implementations, the −0.3 g and/or +0.3 g criteria may be scaled (e.g., reduced) by about 0.0045 g per kph of speed over 10 kph. To prevent too much sensitivity, the lateral force criteria may be limited to about +/−0.12 g, regardless of the speed of the vehicle, for example. In some implementations, the criterion for the given period of time between swerves may be about 3 seconds.

Electronic storage 119 may comprise electronic storage media that electronically stores information. The electronic storage media of electronic storage 119 may comprise one or both of system storage that is provided integrally (i.e., substantially non-removable) with system 100 and/or removable storage that is removably connectable to system 100 via, for example, a port (e.g., a USB port, a firewire port, etc.) or a drive (e.g., a disk drive, etc.). Electronic storage 119 may comprise one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 119 may store software algorithms, recorded video event data, information determined by processor 104, information received via a user interface, and/or other information that enables system 100 to function properly. Electronic storage 119 may be (in whole or in part) a separate component within system 100, or electronic storage 119 may be provided (in whole or in part) integrally with one or more other components of system 100.

As described above, processor 104 may be configured to provide information-processing capabilities in system 100. As such, processor 104 may comprise one or more of a digital processor, an analog processor, a digital circuit designed to process information, an analog circuit designed to process information, a state machine, and/or other mechanisms for electronically processing information. Although processor 104 is shown in FIG. 1 as a single entity, this is for illustrative purposes only. In some implementations, processor 104 may comprise a plurality of processing units. These processing units may be physically located within the same device (e.g., a vehicle event recorder), or processor 104 may represent processing functionality of a plurality of devices operating in coordination.

Processor 110 may be configured to execute components 21-30 by software; hardware; firmware; some combination of software, hardware, and/or firmware; and/or other mechanisms for configuring processing capabilities on processor 110. It should be appreciated that although components 21-30 are illustrated in FIG. 1 as being co-located within a single processing unit, in implementations in which processor 104 comprises multiple processing units, one or more of components 21-30 may be located remotely from the other components. The description of the functionality provided by the different components 21-30 described herein is for illustrative purposes, and is not intended to be limiting, as any of components 21-30 may provide more or less functionality than is described. For example, one or more of components 21-30 may be eliminated, and some or all of its functionality may be provided by other components 21-30. As another example, processor 104 may be configured to execute one or more additional components that may perform some or all of the functionality attributed below to one of components 21-30.

Figure 4B:
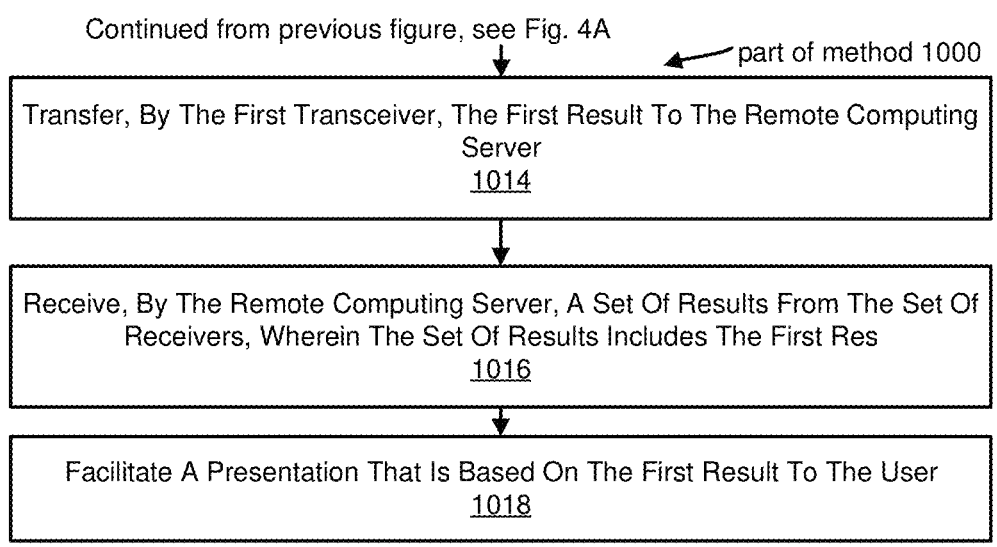

FIGS. 4A-4B illustrate a method 1000 to use a distributed data center to query a fleet of vehicles. The operations of method 1000 presented below are intended to be illustrative. In some implementations, method 1000 may be accomplished with one or more additional operations not described, and/or without one or more of the operations discussed. Additionally, the order in which the operations of method 1000 are illustrated (in FIGS. 4A-4B) and described below is not intended to be limiting. In some implementations, two or more of the operations may occur substantially simultaneously.

In some implementations, method 1000 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1000 in response to instructions stored electronically on one or more electronic storage mediums. The one or more processing devices may include one or more devices configured through hardware, firmware, and/or software to be specifically designed for execution of one or more of the operations of method 1000.

Referring to FIGS. 4A-4B and method 1000, at an operation 1002, output signals are generated by a first set of sensors carried by a first vehicle, wherein the output signals convey first information related to operation of the first vehicle. In some embodiments, operation 1002 is performed by a set of sensors the same as or similar to set of sensors 52*a* (shown in FIG. 1 and described herein).

At an operation 1004, vehicle-specific information is determined and stored locally on the first vehicle. The stored vehicle-specific information is based on the first information. In some embodiments, operation 1004 is performed by a set of resources the same as or similar to set of resources 51*a* (shown in FIG. 1 and described herein).

At an operation 1006, executable code is obtained by the remote computing server from a user. The executable code includes one or more function calls to a standardized Application Program Interface (API). The one or more function calls operate on information related to operation of vehicles. In some embodiments, operation 1006 is performed by a code component the same as or similar to code component 24 (shown in FIG. 1 and described herein).

At an operation 1008, the executable code is transmitted by the remote computing server to a set of transceivers carried by the fleet of vehicles. The set of transceivers includes a first transceiver of the first vehicle. In some embodiments, operation 1008 is performed by a distribution component the same as or similar to distribution component 23 (shown in FIG. 1 and described herein).

At an operation 1010, the executable code is received at the first vehicle from the remote computing server. In some embodiments, operation 1010 is performed by a set of resources the same as or similar to set of resources 51*a* (shown in FIG. 1 and described herein).

At an operation 1012, the executable code is executed at the first vehicle to produce a first result. In some embodiments, operation 1012 is performed by a local result component the same as or similar to local result component 25 (shown in FIG. 1 and described herein).

At an operation 1014, the first result is transferred by the first transceiver to the remote computing server. In some embodiments, operation 1014 is performed by a set of resources the same as or similar to set of resources 51*a* (shown in FIG. 1 and described herein).

At an operation 1016, a set of results is received by the remote computing server from the set of receivers. The set of results includes the first result. In some embodiments, operation 1016 is performed by a centralized result component the same as or similar to centralized result component 26 (shown in FIG. 1 and described herein).

At an operation 1018, a presentation is facilitated, wherein the presentation is based on the first result to the third party. In some embodiments, operation 1018 is performed by a presentation component the same as or similar to presentation component 21 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to use a distributed data center to query a fleet of vehicles, the system configured to couple with the fleet of vehicles, wherein the fleet includes a first vehicle, the system comprising:

a first set of resources for data processing and persistent storage, wherein the first set of resources is carried by the first vehicle of the fleet of vehicles, wherein the first set of resources includes a first transceiver, a first processor, and a first set of sensors, wherein the first transceiver is configured to transfer and receive information to and from the first vehicle and a remote computing server, wherein the first set of sensors is configured to generate output signals conveying first information related to operation of the first vehicle, wherein the first set of resources is configured to determine and store vehicle-specific information locally on the first vehicle, wherein the stored vehicle-specific information is based on the first information; and the remote computing server including one or more processors, wherein the remote computing server is separate and discrete from the fleet of vehicles, and wherein the one or more processors are configured via machine-readable instructions to:

obtain, at the remote computing server, executable code from a user, wherein the executable code includes one or more function calls to a standardized Application Program Interface (API), wherein the one or more function calls operate on information related to operation of vehicles;

transmit the executable code to a set of transceivers carried by the fleet of vehicles, including the first transceiver of the first vehicle;

wherein the first transceiver is further configured to receive the executable code from the remote computing server, wherein the first set of resources is further configured to, subsequent to receipt of the executable code from the remote computing server, execute the executable code locally on the first vehicle to produce a first result, wherein the first result is based on the stored vehicle-specific information;

wherein the first transceiver is further configured to, subsequent to execution of the executable code locally on the first vehicle, transfer the first result to the remote computing server; and wherein the one or more processors of the remote computing server are further configured via machine-readable instructions to:

receive a set of results from the set of receivers, wherein the set of results includes the first result received from the first transceiver; and facilitate a presentation based on the first result to the user.

2. The system of claim 1, wherein the first processor is configured to execute the executable code to produce the first result such that the executable code operates on the stored vehicle-specific information.

3. The system of claim 1, wherein the first set of resources is configured to detect events based on the first information and the executable code, and wherein the first set of resources is further configured to execute the executable code to produce a first result such that the first result is based on the detected events.

4. The system of claim 1, wherein the one or more processors are further configured to enable an operator of the remote computing server to control access by the executable code to the standardized Application Program Interface (API) such that a first subset of the standardized API is not accessible to the executable code and a second subset of the standardized API is accessible to the executable code, and wherein control of the access by the executable code to the standardized Application Program Interface (API) includes an ability to modify elements of the first and/or second subset of the standardized API.

5. The system of claim 1, wherein the executable code includes a definition of one or more of a particular vehicle event, a particular maneuver of a vehicle, and/or a particular condition of a vehicle operator of a vehicle.

6. The system of claim 5, wherein the first result is based on the definition included in the executable code.

7. The system of claim 6, wherein the first set of resources includes a first image sensor configured to capture image information of an environment in and/or about the first vehicle, and wherein the first result includes video information based on the captured image information.

8. The system of claim 1, wherein the first set of resources is configured to execute the executable code in a testing environment, wherein the testing environment limits access of the executable code to a predefined subset of the first set of resources, such that elements of the first set of resources that are not within the predefined subset are protected from being accessed and/or corrupted.

9. The system of claim 1, wherein the first set of resources is configured to detect a particular type of event, wherein the executable code includes an alternative definition of an alternative event of a similar type as the particular type of event, wherein the first result includes (i) first information regarding at least one occurrence of the particular type of event and (ii) second information regarding at least one occurrence of the alternative event.

10. The system of claim 9, wherein the presentation is configured to enable a comparison of the first information and the second information by a manual reviewer.

11. A method for using a distributed data center to query a fleet of vehicles, wherein the distributed data center includes a remote computing server, wherein the fleet includes a first vehicle, the method comprising:

generating, by a first set of sensors carried by the first vehicle, output signals conveying first information related to operation of the first vehicle;

determining and storing vehicle-specific information locally on the first vehicle, wherein the stored vehicle-specific information is based on the first information;

obtaining, by the remote computing server, executable code from a user, wherein the executable code includes one or more function calls to a standardized Application Program Interface (API), wherein the one or more function calls operate on information related to operation of vehicles;

transmitting, by the remote computing server, the executable code to a set of transceivers carried by the fleet of vehicles, including a first transceiver of the first vehicle;

receiving, at the first vehicle, the executable code from the remote computing server;

executing, locally at the first vehicle, the executable code to produce a first result, wherein the first result is based on the stored vehicle-specific information;

transferring, by the first transceiver, the first result to the remote computing server;

receiving, by the remote computing server, a set of results from the set of receivers, wherein the set of results includes the first result received from the first transceiver; and facilitating a presentation based on the first result to the user.

12. The method of claim 11, wherein the set of transceivers includes a second transceiver of a second vehicle carrying a second set of resources, wherein the second set of resources includes the second transceiver and a second processor, wherein the executable code is transmitted to the second transceiver and received at the second vehicle, the method further comprising:

executing, locally at the second vehicle by the second processor, the executable code to produce a second result; and transferring, by the second transceiver, the second result to the remote computing server;
  wherein the set of results further includes the second result, wherein the second result is based on stored vehicle-specific information for the second vehicle, and
  wherein the presentation is further based on the second result.

13. The method of claim 11, further comprising:
detecting events based on the first information and the executable code, wherein execution of the executable code is performed such that the first result is based on the detected events.

14. The method of claim 11, further comprising:
enabling an operator of the remote computing server to control access by the executable code to the standardized Application Program Interface (API) such that a first subset of the standardized API is not accessible to the executable code and a second subset of the standardized API is accessible to the executable code, and wherein control of the access by the executable code to the standardized Application Program Interface (API) includes an ability to modify elements of the first and/or second subset of the standardized API.

15. The method of claim 11, wherein the executable code includes a definition of one or more of a particular vehicle event, a particular maneuver of a vehicle, and/or a particular condition of a vehicle operator of a vehicle.

16. The method of claim 15, wherein the first vehicle carries a first image sensor that captures image information of an environment in and/or about the first vehicle, and wherein the first result includes video information based on the captured image information.

17. The method of claim 11, wherein execution of the executable code is performed in a testing environment, wherein the testing environment limits access of the executable code to a predefined subset of the first set of resources, such that elements of the first set of resources that are not within the predefined subset are protected from being accessed and/or corrupted during the execution of the executable code.

18. The method of claim 17, further comprising:
detecting a particular type of event,
wherein the executable code includes an alternative definition of an alternative event of a similar type as the particular type of event, wherein the first result includes (i) first information regarding at least one occurrence of the particular type of event and (ii) second information regarding at least one occurrence of the alternative event.

19. The method of claim 18, wherein the presentation enables a comparison of the first information and the second information by a manual reviewer.

\* \* \* \* \*